United States Patent [19]
Preis et al.

[11] Patent Number: 5,889,390
[45] Date of Patent: Mar. 30, 1999

[54] CIRCUIT ARRANGEMENT FOR CONVERTING A DC VOLTAGE INTO ANOTHER DC VOLTAGE WITH SIMULTANEOUS REGULATION OF THE EMITTABLE VOLTAGE AT A PREDETERMINED VALUE

[75] Inventors: Karl-Heinrich Preis, Buehlertal; Gerhard Decker, Achern; Thomas Riehemann, Buehlertal, all of Germany

[73] Assignee: Robert Bosch GmbH, Stuttgart, Germany

[21] Appl. No.: 933,947

[22] Filed: Sep. 19, 1997

[30] Foreign Application Priority Data

Sep. 23, 1996 [DE] Germany ............... 296 16 457 U

[51] Int. Cl.$^6$ .................................................. H02M 3/156
[52] U.S. Cl. .................... 323/222; 323/282; 323/284; 323/266; 363/21
[58] Field of Search .................... 323/222, 266, 323/284, 282, 286; 363/18, 19, 21

[56] References Cited

U.S. PATENT DOCUMENTS

| | | | |
|---|---|---|---|
| 4,642,550 | 2/1987 | Illuzzi et al. | 323/222 |
| 4,999,566 | 3/1991 | Kuehn | 323/222 |
| 5,216,351 | 6/1993 | Shimoda . | |
| 5,412,555 | 5/1995 | Uramoto | 363/18 |

FOREIGN PATENT DOCUMENTS 43 40 991 A1  6/1995  Germany .

OTHER PUBLICATIONS

"Aufwärts-/Abwärts-Schaltregler", Elektronik 26/26, 12, 1985. pp. 57–59.
U. Tietze et al.: "Halbleiter-Schaltungstechnik". [Semiconductor Circuit Engineering], 9$^{th}$ edigion, Springer Verlag 1989, pp. 560–573.

Primary Examiner—Peter S. Wong
Assistant Examiner—Rajnikant B. Patel
Attorney, Agent, or Firm—Venable; George H. Spencer; Norman N. Kunitz

[57] ABSTRACT

A circuit arrangement for converting a DC voltage into another DC voltage, with simultaneous regulation of the emittable voltage ($U_A$) at a predetermined value. The circuit arrangement includes a combination of an upward and a downward transformer having at least one switching transistor (3) connected in series with a common memory coil (1) to a circuit output terminal, and a smoothing capacitor (5) connected in parallel to the output load (6), i.e., across the output terminals. The coil (1) is connected for a specific time to the supply voltage source ($U_{Bat}$) by a time function circuit (9, 10). The coil (1) is connected directly to the positive pole (+) of the supply-voltage source ($U_{Bat}$), and a current limiter circuit is provided in the long or forward branch of the circuit arrangement in front of the output of the circuit arrangement, with the current limiter circuit comprising a resistor (4) and a transistor (15) and influencing the switching transistor (3) disposed in the long branch. In addition to a first voltage limiting circuit formed of a series connection of a resistor and a Zener diode (16, 17), a further voltage limiter circuit (18, 19) is provided in parallel with the first voltage limiting circuit as short-circuit protection, with the further limiter likewise comprising the series connection of a resistor (18) and a Zener diode (19) which, however, has a different breakdown voltage than the first Zener diode (17).

9 Claims, 1 Drawing Sheet

# CIRCUIT ARRANGEMENT FOR CONVERTING A DC VOLTAGE INTO ANOTHER DC VOLTAGE WITH SIMULTANEOUS REGULATION OF THE EMITTABLE VOLTAGE AT A PREDETERMINED VALUE

REFERENCE TO RELATED APPLICATIONS

This application claims the priority of German patent application Serial No. 2 96 16 457.7, filed Sept. 23, 1996, which is incorporated herein by reference.

BACKGROUND OF THE INVENTION

The invention is based on a circuit arrangement for converting a DC voltage into another DC output voltage with simultaneous regulation of the emittable output voltage at a predetermined value.

In a circuit arrangement of this type, which is known from German laid open patent application DE-OS 43 40 991, corresponding to U.S. patent application Ser. No. 08/652, 510, filed Aug. 23, 1996, the voltage converter includes a reactor or coil and a power switch that is switched on and off as dictated by the current flowing in the coil. A comparator compares the current flowing in the coil to a predetermined threshold value. If the threshold value is exceeded, the power switch is switched. Following a voltage jump at the coil, a provided timer maintains the power switch in the present switching state for the time that has been set by the timer.

In this known circuit arrangement, the power switch is disposed between the connection of the supply DC voltage and the memory coil, which can be disadvantageous with regard to efficiency. Moreover, it has been seen that optimum ratios cannot be assured with simple means in all possible operating situations.

SUMMARY AND ADVANTAGES OF THE INVENTION

The above drawbacks according to the known circuit arrangements generally are overcome according to the present invention by a circuit arrangement for converting a DC voltage into another DC voltage, with simultaneous regulation of the emittable voltage ($U_A$) at a predetermined value, wherein: a combination of an upward and a downward converter with at least one switching transistor and a common coil or reactor is provided, as is a smoothing capacitor connected in parallel to the output load, and in which the coil can be connected for a specific time to the supply voltage ($U_{Bat}$) by a time function circuit element; the coil is connected directly to the positive pole (+) of the supply-voltage source ($U_{Bat}$): and a current limiter, which comprises a resistor and a transistor, is provided in the long or series branch of the circuit arrangement in front of the output of the circuit arrangement and influences the switching transistor disposed in the long branch of the circuit arrangement.

In contrast, to the above mentioned known arrangement, the basic circuit arrangement according to the invention described above, has the advantage of increased efficiency and an effective current limitation, and thus avoids endangerment of certain components and offers the option of using simpler and less expensive components. This advantage should not be underestimated with respect to mass production.

According to the solution underlying the present invention, the circuit arrangement is configured such that the memory choke or coil is connected directly to the positive pole of the supply-voltage source, and a current limiter, that particularly comprises a resistor and a transistor, is provided in the in the long, series or forward branch of that circuit, and influences the switching transistor disposed in the long branch before, i.e., upstream of, the output of the circuit arrangement.

Advantageous modifications of and improvements to the basic circuit arrangement are disclosed and described.

In a particularly advantageous modification of the invention, the resistor of the current limiter is connected in series with the collector-emitter path of the switching transistor, and is connected by one of its connections or leads to the output of the circuit arrangement, while the other connection or lead of the resister is connected to both the switching transistor and to the base of the transistor of the current limiter, with the collector-emitter path of this transistor being disposed between the base of the switching transistor and the output of the circuit arrangement. This effects an especially effective current limitation in a simple manner, which, particularly at the switch-on time and in the event of a short-circuit, limits the current to limits that are permissible for the components that are used. With correspondingly-selected dimensioning, it also becomes possible to use components that have lower permissible values and are accordingly less expensive.

In accordance with an especially advantageous embodiment of the circuit arrangement of the invention, a voltage-limiting arrangement comprising the series connection of a resistor and a Zener diode is connected to the collector of the switching transistor, with the common connecting point of the resistor and the Zener diode of the limiting arrangement being connected to the base of the switching transistor. In a particularly useful manner, this voltage-limiting arrangement element serves as both the high value setting element and as the downward adjustment or regulating element. In an especially useful modification of this embodiment of the circuit arrangement according to the invention, an additional voltage-limiting arrangement, likewise comprising a series connection of a resistor and a Zener diode, is disposed in parallel with the path of the former voltage-limiting arrangement comprising the series connection of a resistor and a Zener diode, with the voltage value of the former Zener diode being selected to be different from the voltage value of the latter Zener diode, namely higher. This modification in the form of an additional voltage limitation also ensures an effective voltage limitation in the event of a short circuit, because the voltage-limiting arrangement used by both the high value setting element and the downward adjustment element is not effective for the upward converter in this case.

The circuit arrangement of the invention can be used particularly practically in a motor vehicle. From an input voltage fluctuating between about 5 and 25 V, it can generate an output voltage that is stabilized at about 13 V, as is especially required for the voltage and current supply of high-pressure gas discharge lamps.

BRIEF DESCRIPTION OF THE DRAWINGS

The invention is explained in detail in the following description by way of an embodiment illustrated in the drawing.

DETAILED DESCRIPTION OF THE PREFERRED EMBODIMENT

Figure 1:
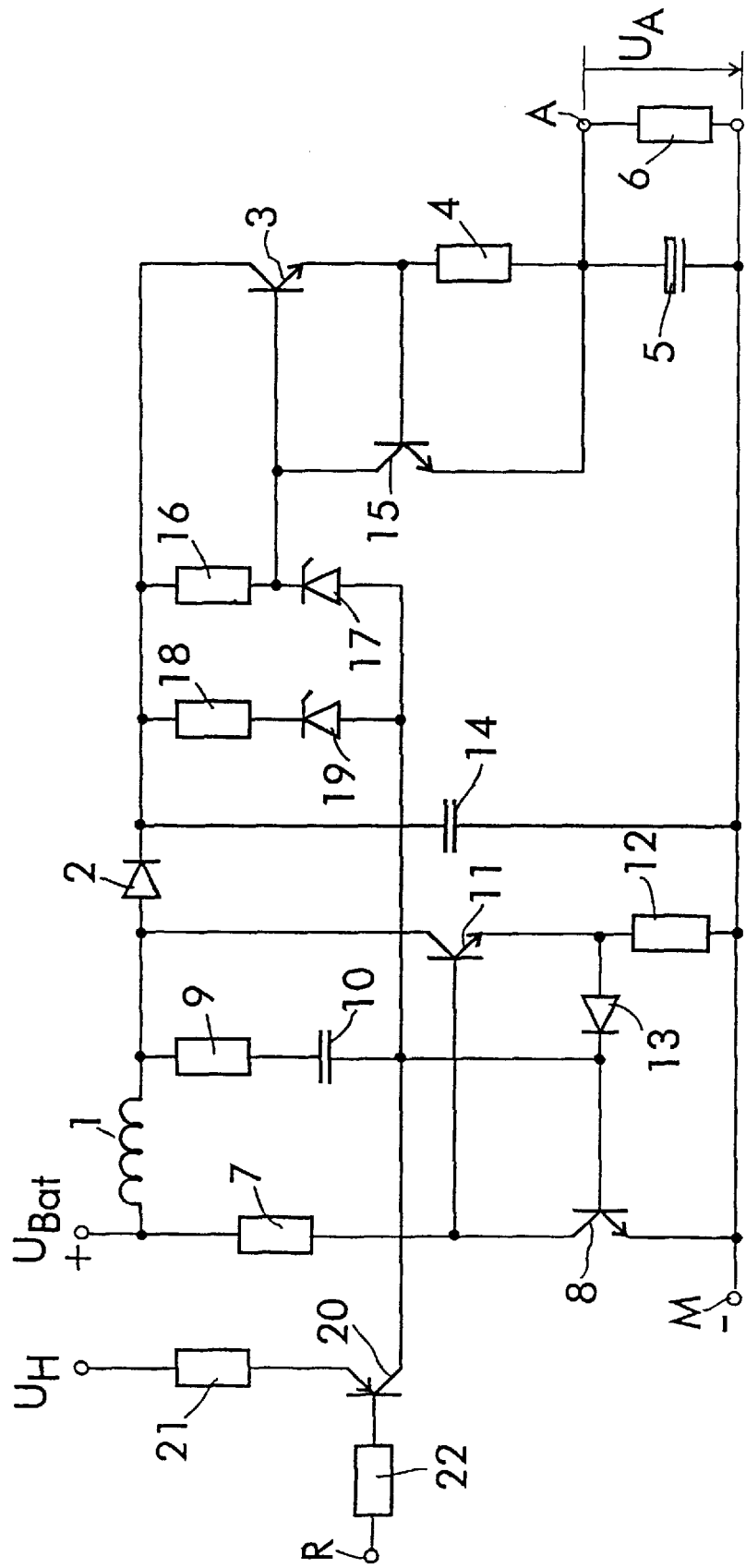
FIG. 1 shows a schematic circuit diagram of the control circuit arrangement according to the invention.

In accordance with the invention, a memory choke or coil 1 is connected directly to the positive pole+of a supply-voltage source $U_{Bat}$. A diode 2 that is poled in the direction of the output A, the collector-emitter path of a switching transistor configured as, for example, an npn transistor, and a resistor 4 are connected in series with memory coil 1 in the long or series branch of the voltage converter circuit between the positive pole of the supply voltage source and the high side of the circuit output A. A smoothing capacitor 5 and a load resistor 6 are connected in parallel across the output A, at which the stabilized and regulated output voltage $U_A$ appears. Smoothing capacitor 5 typically possesses a high capacity, and can be configured as, for example, a tantalum-electrolyte capacitor.

The circuit arrangement shown in the drawing figure includes a plurality of transverse branches. First, the series connection of a resistor 7 with the collector-emitter path of an npn transistor 8 is disposed between the positive pole + and ground M of the supply-voltage source $U_{Bat}$, at the input side of the coil 1. The series connection of a resistor 9 and a capacitor 10 is connected at the output side of coil 1 and to the base of transistor 8. Furthermore, the output side of coil 1 and the anode terminal of diode 2 are connected to ground M via a series connection of the collector-emitter path of an npn transistor 11 and a resistor 12. The base of transistor 8 is connected via the cathode-anode path of a diode 13 to the connecting point of the collector-emitter path of transistor 11 and resistor 12, as well as to capacitor 10. A smoothing capacitor 14 having a low capacity is disposed between the cathode terminal of diode 2 and ground M.

The collector-emitter path of an npn transistor 15 is provided between the base of switching transistor 3 and output A, with the base of transistor 15 being connected to the common connecting point of the emitter of switching transistor 3 and resistor 4. Transistor 15 and resistor 4 form a current limiter in the long or series branch of the circuit that permits a simple and effective limitation of the current to the permissible values with correspondingly-selected dimensions of the associated components. This also effectively limits the charging current for smoothing capacitor 5. This is especially significant for switching on and short-circuits.

For regulating output voltage $U_A$, a series connection of a resistor 16 and a Zener diode 17 is provided as a voltage limiter. This voltage limiting series connection 16, 17 is connected at one end to the cathode of a diode 2 (or the collector of switching transistor 3) by the free end of the resistor 16 and, an its other end to the base of transistor 8 by the anode terminal of Zener diode 17. The connecting common point of this voltage regulating series connection 16, 17, that is, the cathode of Zener diode 17, is connected to the base of switching transistor 3.

In a special modification of the circuit arrangement of the invention that is significant for short-circuits, a further voltage-limiting arrangement is connected in parallel with the above-described voltage limiter 16, 17. This further voltage limiter arrangement likewise comprises the series connection of a resistor 18 and a Zener diode 19. The breakdown voltage value of Zener diode 19 is selected to differ from that of Zener diode 17, and in particular has a higher value in the preferred embodiment. Thus, an effective voltage limitation is permitted if the voltage limiter comprising resistor 16 and Zener diode 17 is ineffective for the upward conversion during a short-circuit. The breakdown voltage for Zener diode 17 can be 13 V, for example, and the breakdown voltage of Zener diode 19 can be 15 V, with regulation and stabilization at an output voltage $U_a$ of approximately 13 V.

The base of transistor 8 is connected to a reset switching circuit for resetting the basic converter circuit arrangement. This reset switching circuit comprises a pnp transistor 20, whose emitter is connected via a resistor 21 to an auxiliary voltage $U_H$, which can be, for example, 5 V. The base of transistor 20 is actuated, via a resistor 22, by the reset signal from a signal input R. The collector of transistor 20 is connected to the base of transistor 8.

The circuit arrangement configured in accordance with the invention comprises the combination of a high value setting element operating as an upward converter or transformer, and a downward converter or transformer that regulates the high generated DC voltage down to a desired, stabilized output value. In the illustrated embodiment, the components provided with reference numerals 1, 2, 7, 8, 9, 10, 11, 12, 13 and 14, as well as the voltage limiter comprising resistor 16 and Zener diode 17, form the high voltage value setting element or upward converter. This voltage limiter 16, 17 is simultaneously a component of the downward converter or regulator, in addition to the commonly-used coil 1. This downward regulator or converter also includes the components indicated by 3, 4, 5 and 15. The voltage limiter 18, 19 additionally provided for short-circuits is more likely to be included as part of the high voltage value setting element.

Using relatively few components, the circuit arrangement configured in accordance with the invention makes available an economical and reliable voltage supply. This is particularly advantageously applicable to motor vehicles, for example, for the current and voltage supply of high-pressure gas discharge lamps. The provided current and voltage limitation also reduces the particularly critical switch-ons and short-circuits, providing effective protection against unallowable switch-on spikes and resulting overvoltage peaks. The direct connection of the coil to the positive pole of the supply-voltage voltage source increases and sustains effectiveness with an overall reduced number of components.

The invention now being fully described, it will be apparent to one of ordinary skill in the art that any changes and modifications can be made thereto without departing from the spirit or scope of the invention as set forth herein.

What is claimed:

1. A circuit arrangement for converting a DC voltage, with simultaneous regulation of an emittable voltage ($U_A$) at a predetermined value, said circuit arrangement comprising a combination of an upward and a downward voltage converter with at least one switching transistor connected in series with a common coil in a forward circuit branch between a positive pole of a supply voltage source and one of a pair of output terminals, a smoothing capacitor connected in parallel with an output load and between said pair of output terminals, and circuit means, including a timing circuit, for connecting the common coil to the supply voltage ($U_{Bat}$) for a specific time period; and wherein: the coil is connected directly to the positive pole (+) of the supply-voltage source ($U_{Bat}$); and a current limiter, comprising a resistor and a further transistor, is connected in a long branch of the circuit arrangement in front of the output terminals of the circuit arrangement, and influences the switching transistor disposed in the long branch of the circuit arrangement.

2. The circuit arrangement as defined in claim 1, wherein the resistor is connected in series with the collector-emitter path of the switching transistor with one end connected to the one of a pair of output terminals of the circuit arrangement, and its other end connected to both the switching transistor and the base of the further transistor of the current limiter, and the collector-emitter path of the further transistor is disposed between the base of the switching transistor and the one of a pair of output terminals of the circuit arrangement.

3. The circuit arrangement as defined in claim 2, wherein a first voltage-limiter circuit for the converter circuits, comprising the series connection of a first resistor and a first Zener diode is connected to the collector of the switching transistor, with the common connecting point of the first resistor and the first Zener diode being connected to the base of the switching transistor.

4. The circuit arrangement as defined in claim 3, wherein an additional voltage-limiter circuit, comprising the series connection of a further resistor and a further Zener diode, is connected in parallel with the first voltage-limiter circuit comprising the series connection of the first resistor and the first Zener diode, and wherein the breakdown voltage value of the further Zener diode is different from the breakdown voltage of the first Zener diode.

5. The circuit arrangement as defined in claim 4, wherein the breakdown voltage value of the further Zener diode is higher than the breakdown voltage value of the first Zener diode.

6. The circuit arrangement as defined in claim 1, wherein a first voltage-limiter circuit for the converter circuits, comprising the series connection of a first resistor and a first Zener diode is connected to the collector of the switching transistor, with the common connecting point of the first resistor and the first Zener diode being connected to the base of the switching transistor.

7. The circuit arrangement as defined in claim 6, wherein an additional voltage-limiter circuit, comprising the series connection of a further resistor and a further Zener diode, is connected in parallel with the first voltage-limiter circuit comprising the series connection of the first resistor and the first Zener diode, and wherein the breakdown voltage value of the further Zener diode is different from the breakdown voltage of the first Zener diode.

8. The circuit arrangement as defined in claim 7, wherein the breakdown voltage value of the further Zener diode is higher than the breakdown voltage value of the first Zener diode.

9. The circuit arrangement as defined in claim 1, wherein the circuit arrangement is disposed in a motor vehicle and the supply voltage source is a vehicle battery.

* * * * *